US010783781B2

(12) United States Patent
Ootsuji

(10) Patent No.: US 10,783,781 B2
(45) Date of Patent: Sep. 22, 2020

(54) AUTOMATIC DRIVING SYSTEM

(71) Applicant: HITACHI AUTOMOTIVE SYSTEMS LTD., Hitachinaka-shi, Ibaraki (JP)

(72) Inventor: Shinya Ootsuji, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 280 days.

(21) Appl. No.: 15/518,044

(22) PCT Filed: Sep. 24, 2015

(86) PCT No.: PCT/JP2015/076827
§ 371 (c)(1),
(2) Date: Apr. 10, 2017

(87) PCT Pub. No.: WO2016/080070
PCT Pub. Date: May 26, 2016

(65) Prior Publication Data
US 2017/0294120 A1     Oct. 12, 2017

(30) Foreign Application Priority Data
Nov. 17, 2014    (JP) ................................ 2014-232950

(51) Int. Cl.
*G08G 1/09*      (2006.01)
*G08G 1/0967*    (2006.01)
(Continued)

(52) U.S. Cl.
CPC ..... *G08G 1/096725* (2013.01); *B60K 28/066* (2013.01); *B60K 31/0058* (2013.01);
(Continued)

(58) Field of Classification Search
CPC ...... B60W 40/04; B60W 50/02; B60W 50/08; B60W 50/14; G01C 21/34; G01C 22/00; G05D 1/00
(Continued)

(56) References Cited

U.S. PATENT DOCUMENTS 9,587,952 B1 *   3/2017   Slusar ................. G01C 21/3492
9,646,428 B1 *   5/2017   Konrardy ........... G06K 9/00845
(Continued)

FOREIGN PATENT DOCUMENTS

EP         3 140 817 A1     3/2017
JP        2002-274305 A    9/2002
(Continued)

OTHER PUBLICATIONS

International Search Report dated Jan. 26, 2016 as received in corresponding International Application No. PCT/JP2015/076827.
(Continued)

*Primary Examiner* — Peter D Nolan
*Assistant Examiner* — Wae L Louie
(74) *Attorney, Agent, or Firm* — Foley & Lardner LLP

(57) ABSTRACT

The present invention provides an automatic driving system capable of clearly identifying the factors responsible for causing an abnormality such as an accident or malfunction of a vehicle during automatic driving after the fact. The automatic driving system automatically selects, from each automatic driving function provided in the vehicle or each level of driving automation into which each automatic driving function is classified, an automatic driving function or a level of driving automation according to the circumstances surrounding the vehicle or the driving state of the vehicle, automatically performs a part of or the entirety of a vehicle driving operation to automatically drive the vehicle, and, remembers the time of automatic driving and informa-
(Continued)

tion indicating the selected automatic driving function or level of driving automation at that time.

5 Claims, 4 Drawing Sheets

(51) Int. Cl.

| | |
|---|---|
| B60R 21/00 | (2006.01) |
| G08G 1/00 | (2006.01) |
| G07C 5/08 | (2006.01) |
| B60W 50/02 | (2012.01) |
| G05D 1/00 | (2006.01) |
| B60K 28/06 | (2006.01) |
| B60K 31/00 | (2006.01) |
| B62D 1/02 | (2006.01) |
| B62D 1/28 | (2006.01) |
| B62D 12/02 | (2006.01) |
| B60W 50/00 | (2006.01) |
| B60W 30/00 | (2006.01) |

(52) U.S. Cl.
CPC ......... *B60R 21/00* (2013.01); *B60W 50/0205* (2013.01); *B62D 1/02* (2013.01); *B62D 1/28* (2013.01); *B62D 12/02* (2013.01); *G05D 1/0061* (2013.01); *G07C 5/085* (2013.01); *G08G 1/00* (2013.01); *G08G 1/096758* (2013.01); *B60K 2370/175* (2019.05); *B60W 30/00* (2013.01); *B60W 2050/0072* (2013.01); *B60W 2050/0089* (2013.01); *B60W 2554/00* (2020.02); *B60W 2756/10* (2020.02)

(58) Field of Classification Search
USPC .............................................. 701/2, 23, 32.3
See application file for complete search history.

(56) References Cited

U.S. PATENT DOCUMENTS

| | | | |
|---|---|---|---|
| 9,963,106 B1* | 5/2018 | Ricci .................... | B60R 25/2018 |
| 9,972,054 B1* | 5/2018 | Konrardy .......... | B60W 50/0205 |
| 10,042,359 B1* | 8/2018 | Konrardy .............. | B60R 25/102 |
| 2004/0088089 A1* | 5/2004 | Bauer .................... | G07C 5/085 |
| | | | 701/32.3 |
| 2012/0101660 A1* | 4/2012 | Hattori ................. | G05D 1/0022 |
| | | | 701/2 |
| 2014/0297116 A1* | 10/2014 | Anderson ............ | B60G 11/265 |
| | | | 701/37 |
| 2015/0375757 A1* | 12/2015 | Schiek ................... | B60K 35/00 |
| | | | 701/23 |
| 2016/0355192 A1* | 12/2016 | James .................... | B60W 50/14 |
| 2017/0050642 A1* | 2/2017 | Heckmann ............ | B60W 40/04 |
| 2017/0090480 A1* | 3/2017 | Ho ......................... | G05D 1/0027 |
| 2017/0197632 A1* | 7/2017 | Rieth ................... | B60W 50/082 |
| 2017/0267256 A1* | 9/2017 | Minster ............... | B60W 50/082 |
| 2017/0294120 A1* | 10/2017 | Ootsuji ................. | B62D 12/02 |
| 2018/0050704 A1* | 2/2018 | Tascione ............... | B60W 10/04 |
| 2018/0188726 A1* | 7/2018 | Newman ............... | B60W 50/00 |
| 2018/0224932 A1* | 8/2018 | Von Novak ............. | G06T 11/60 |

FOREIGN PATENT DOCUMENTS

| | | |
|---|---|---|
| JP | 2010-182148 A | 8/2010 |
| JP | 2010-205123 A | 9/2010 |
| JP | 2012-108868 A | 6/2012 |

OTHER PUBLICATIONS

Written Opinion of the International Search Authority dated Jan. 26, 2016 as received in corresponding International Application No. PCT/JP2015/076827.
Extended European Search Report issued in corresponding application No. 15860992.5 dated Jul. 5, 2018.
Office Action issued in corresponding European Patent Application No. 15860992.5 dated Jul. 2, 2020.

* cited by examiner

AUTOMATIC DRIVING SYSTEM

TECHNICAL FIELD

The present invention relates to an automatic driving system, for example, an automatic driving system that automatically operates each device mounted on a vehicle by various automatic driving functions provided in a vehicle, and automatically performs part or all of the vehicle driving operation.

BACKGROUND ART

In recent years, an automatic driving system has been developed in which part or all of the vehicle driving operation is automatically performed and the vehicle is automatically driven. The driving support control system which automates part of an occupant's driving operation, and supports the operation is known. Examples of the system include, in order to reduce the driving load of the occupant, an inter-vehicle distance maintain traveling control in which inter-vehicle distance between the occupant's own vehicle and the preceding vehicle traveling ahead is maintained while recognizing the external environment of the occupant's own vehicle, and a driving lane maintaining control in which the occupant's own vehicle does not deviate from its travel lane. In addition, as its development, a complete automatic driving system is studied in which the system carries out all of the driving operation without operation by an occupant and the vehicle is automatically driven.

Further, in studies of recent automatic driving systems, an appropriate automatic driving function is automatically selected from various automatic driving functions capable of accomplishing the above-described automatic driving system according to circumstances surrounding the vehicle and driving state of the vehicle, and an appropriate driving operation is automatically performed according to the circumstances surrounding the vehicle and the driving state of the vehicle.

Meanwhile, in the field of such an automatic driving system, there is a demand for clarifying where the responsibility lies in the event of an accident during the automatic driving, and a conventional technique for such a demand is disclosed in PTL 1.

The operation system for vehicle occupant non-operation currently disclosed by PTL 1 includes a notification unit configured to, before the start of a non-manipulation operation, cause a notification device to notify that a consent-input person has the responsibility related to the non-manipulation operation in which a vehicle is operated without manipulation of an occupant of the vehicle, a consent-input person information acquisition unit configured to, after the notification device notifies where the responsibility lies, acquire the consent-input person information for identifying the consent input person who inputs the consent into an operation unit, a record unit configured to associate consent information which is information on consent inputted into the operation unit with the consent-input person information acquired by the consent-input person information acquisition unit to cause a consent-input person information storage unit to store the consent information and the consent-input person information, and a non-manipulation operation control unit configured to, after the notification device notifies where the responsibility lies, start the non-manipulation operation of the vehicle, on the basis of the input of the consent into the operation unit.

CITATION LIST

Patent Literature

PTL 1: JP 2012-108868 A

SUMMARY OF INVENTION

Technical Problem

The automatic driving system according to the above-mentioned conventional technique causes the occupant to operate (start) the automatic driving after acknowledging that he/she is responsible for the operation. However, the advantage of the automatic driving is that the passenger is released from the driving operation, which is not necessarily required to be carried out with the occupant's responsibility. For example, in a fully automatic driving system, it can be considered that the responsibility associated with vehicle running is on the system side. In general, where the responsibility lies during the vehicle traveling varies between the system and the occupant depending on the state of the automatic driving system to be used (for example, whether the operation is carried out under an automatic driving system that automatically performs part of the driving operation, or an automatic driving system that automatically performs all of the driving operation, and when the operation is carried out under the automatic driving system which automatically performs part of the driving operation, how is the degree of contribution and the degree of involvement of the occupant for the operation) (in other words, various automatic driving functions operating in the automatic driving system).

Therefore, it is not appropriate to impose a single responsibility on either side when using automatic driving as disclosed in PTL 1, and in this field, it is required to clarify after the accident where the responsibility lies, which depends on the state of the automatic driving system to be used, in particular, to clearly grasp where the responsibility lies corresponding to the state of the automatic driving system that changes from moment to moment in the automatic driving system where the state of the automatic driving system to be used automatically changes.

The present invention is made in view of the above problem, and an object of the present invention is to provide, in an automatic driving system in which the state of an automatic driving system to be used automatically changes, an automatic driving system capable of clearly grasping where the responsibility lies in the event of occurrence, for example, in the event of abnormality such as an accident or malfunction of a vehicle.

Solution to Problem

In order to solve the problem, an automatic driving system according to the present invention is an automatic driving system which automatically selects, from each automatic driving function provided in a vehicle or each level of driving automation into which each automatic driving function is classified, an automatic driving function or a level of driving automation according to a circumstance surrounding the vehicle and/or a driving state of the vehicle, and automatically performs part of or all of a driving operation of the vehicle to automatically drive the vehicle, wherein the automatic driving system stores information indicating a time during an automatic driving, and information indicating an automatic driving function or a level of driving automation selected at the time.

Advantageous Effects of Invention

According to the present invention, for example, when the event of abnormality such as an accident or malfunction of a vehicle occurs, it is possible to grasp after the event which automatic driving function or which level of driving automation was selected at the time of the event, and where the responsibility lies can be clearly grasped after the event.

The problems, configurations, and effects other than those described above will be clarified from the description of the following embodiments.

DESCRIPTION OF EMBODIMENTS

Hereinafter, embodiments of the automatic driving system according to the present invention will be described with reference to drawings.

First Embodiment

Figure 1:
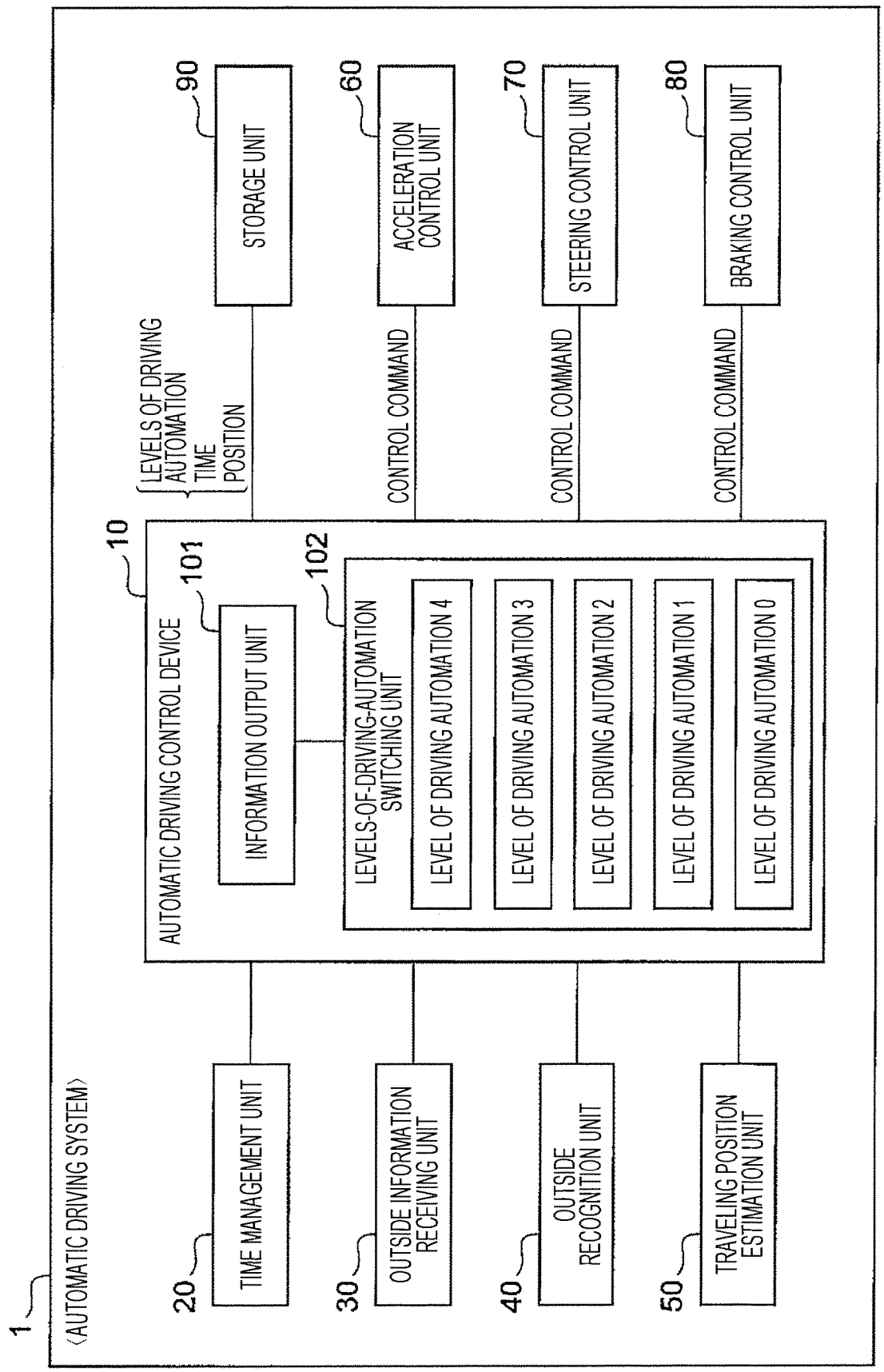
FIG. 1 is a block diagram showing a system configuration of an automatic driving system according to a first embodiment of the present invention.

FIG. 1 shows a system configuration of a first embodiment of the automatic driving system according to the present invention.

As shown in FIG. 1, the automatic driving system 1 of the first embodiment is mounted on a vehicle such as an automobile, and mainly includes an automatic driving control device 10, a time management unit 20 for managing the time, an outside information receiving unit 30 for receiving information such as the road condition of the vehicle from an external device, an outside recognition unit 40 for recognizing the external situation around the vehicle by using a camera, a radar, etc., a traveling position estimation unit 50 for estimating a traveling position of the occupant's own vehicle from information on a position measurement device such as a GPS receiver, vehicle speed information and the like, an acceleration control unit 60 for performing acceleration control of the vehicle based on a control command outputted from the automatic driving control device 10, a steering control unit 70 for performing steering control of the vehicle, a braking control unit 80 for performing braking control of the vehicle, and a storage unit 90 having a recording medium for recording the level of driving automation and the like selected by the automatic driving control device 10.

First, "level of driving automation" used in the present invention will be described using an example. This "level of driving automation" is defined as a state which is classified in stages, wherein the state of the automatic driving system (in other words, each automatic driving function operating in the automatic driving system) is classified to each level according to degree of contribution or degree of involvement of the occupant (driver). For example, a state in which all of the acceleration, steering, and braking are performed by the automatic driving system and the driver is not involved at all is defined as "level of driving automation 4" as the top level fully automatic driving. A state in which while as part of automatic driving, the automatic driving system implements all of acceleration, steering, and braking, the driver have to cope with the system only in case of emergency is defined as "level of driving automation 3". Next, a state in which while the automatic driving system implements some of acceleration, steering, and braking, the driver always needs to watch the movement of the system is defined as "level of driving automation 2". Next, a state in which while the driver mainly operates acceleration, steering, and braking, the automatic driving system supports part of the driving operations is defined as "level of driving automation 1". In addition, a state in which the driver needs to operate the vehicle completely without intervention of the automatic driving system can be defined as "level of driving automation 0". Such levels of driving automation include a level where the responsibility at the time of driving the vehicle is on the system side and a level where the responsibility is on the occupant (driver) side.

The automatic driving control device 10 incorporates a levels-of-driving-automation switching unit 102 for performing switching determination of the levels of driving automation and switching of the target control mode, and an information output unit 101 for outputting information on the levels-of-driving-automation switching unit 102 to the storage unit 90 and the like.

The levels-of-driving-automation switching unit 102 determines whether switching of the levels of driving automation as described above is necessary or not, based on the traveling environment and traveling state of the occupant's own vehicle during automatic driving obtained from the outside information receiving unit 30, the outside recognition unit 40, and the traveling position estimation unit 50, and when it is determined that switching of the levels of driving automation is necessary, selects a level of driving automation corresponding to the determination.

Figure 2:
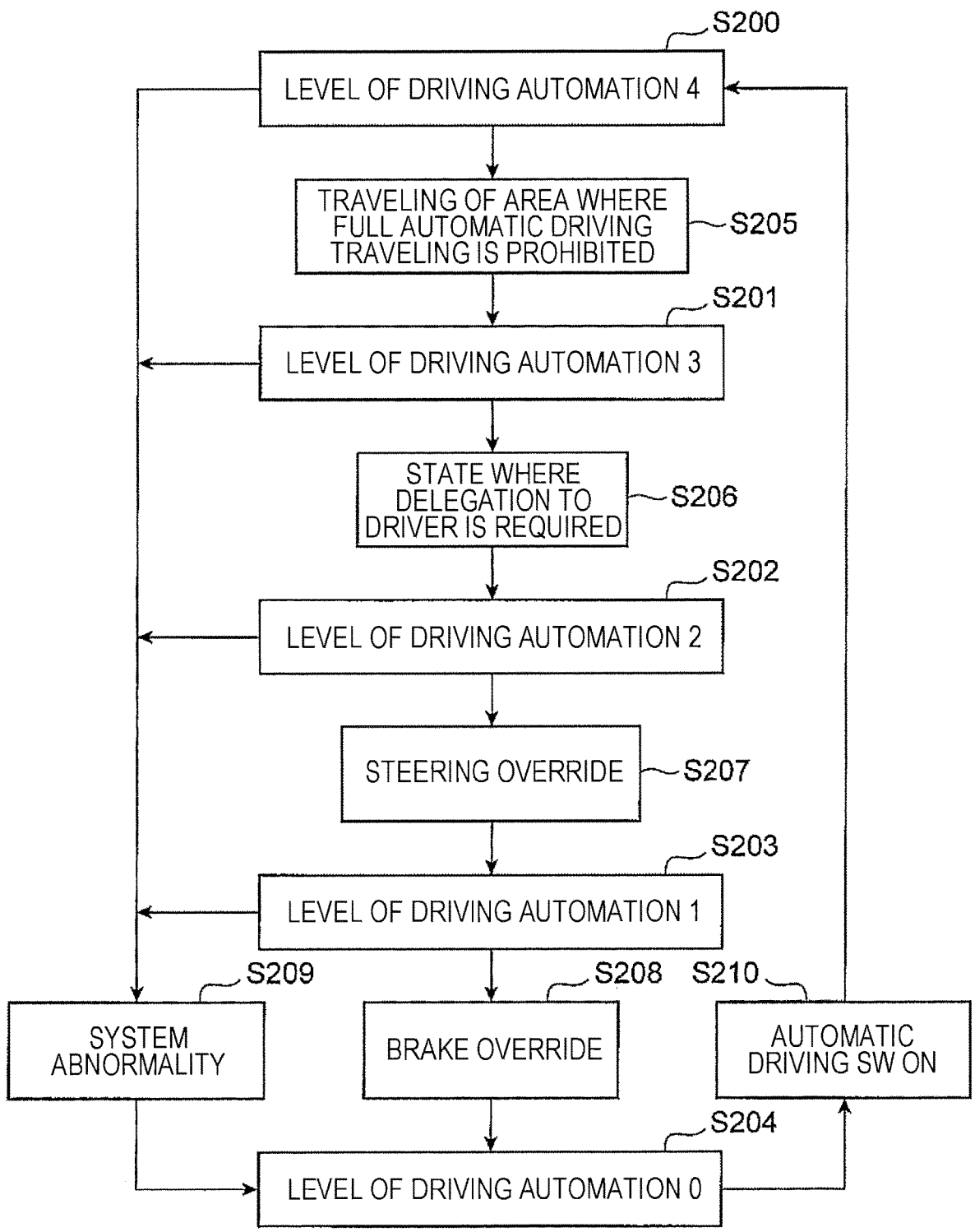
FIG. 2 is a state transition diagram of levels-of-driving-automation switching processing by a levels-of-driving-automation switching unit shown in FIG. 1.

FIG. 2 shows an example of levels-of-driving-automation switching processing by the levels-of-driving-automation switching unit 102 shown in FIG. 1.

For example, when the driver starts the engine, "level of driving automation 0" is selected as the level of driving automation (S204). However, when the driver turns on the automatic driving switch provided in the vehicle (S210), the level of driving automation shifts to "level of driving automation 4" and the automatic driving system starts the automatic driving (complete automatic driving) (S200). In the case where the driver enters an area where the driver is required to keep a close watch during traveling at "level of driving automation 4" and the predetermined fully-automatic driving is prohibited (S205), the level of driving automation shifts to "level of driving automation 3" (S201). Thereafter, when the automatic driving cannot cope with conditions such as complicated traffic conditions and it is necessary to delegate operation to the driver (S206), the level of driving automation shifts to "level of driving automation 2" (S202). When the driver detects a steering override (S207) in which the driver performs steering, the level of driving automation shifts to "level of driving automation 1" (S203), and the automatic driving system performs driving support only for acceleration and braking. When the driver further applies the brake to be in a state of the brake override (S208), the level of driving automation shifts to "level of driving automation 0" (S204), and all the automatic driving functions are turned off. On the other hand, even if one of "level of driving automation 4" to "level of driving automation 1" is selected as the level of driving automation, when an abnormality such as a failure occurs in the system or the like (S209), the level of driving automation shifts to "level of driving automation 0" (S204), and all the automatic driving functions are turned off.

The processing shown in FIG. 2 is an example, and the present invention is not limited to this levels-of-driving-automation switching processing. For example, at the time of starting the engine, a level of driving automation other than "level of driving automation 0" may be selected, or a step may be shifted directly from "level of driving automation 4" to "level of driving automation 2", "level of driving automation 1", or "level of driving automation 0". Further, naturally, the level of driving automation may be raised to a higher level according to information (circumstances surrounding the vehicle and driving state of the vehicle) obtained from the outside information receiving unit 30, the outside recognition unit 40, and the traveling position estimation unit 50.

The information output unit 101 of the automatic driving control device 10 receives the level of driving automation held by the levels-of-driving-automation switching unit 102 and outputs the level to the storage unit 90. At that time, time information obtained from the time management unit 20 is added and outputted. As the time information managed by the time management unit 20, for example, the time stamp information obtained by a GPS receiver which is included as a configuration of the traveling position estimation unit 50 may be used, or the time information managed uniquely by the entire system may be used. The information output unit 101 periodically outputs the information to the storage unit 90 at predetermined time intervals according to the time managed by the time management unit 20 after the automatic driving starts.

The information output unit 101 also outputs a control command corresponding to the level of driving automation held by the levels-of-driving-automation switching unit 102 to the acceleration control unit 60, the steering control unit 70, and the braking control unit 80, and performs a traveling control of the vehicle.

Upon receiving the information output from the information output unit 101, the storage unit 90 accumulates the received information in a form corresponding to the time information.

As described above, since the automatic driving system 1 according to the first embodiment includes the information output unit 101 that outputs a time during automatic driving, and a (selected) level of driving automation held by the levels-of-driving-automation switching unit 102 at that time, and the storage unit 90 for storing information outputted from the information output unit 101, when, for example, the event of abnormality such as an accident or malfunction of a vehicle occurs, the automatic driving system 1 can detect the level of driving automation selected at the time of the occurrence after the event, and clearly grasp where the responsibility lies after the event.

In addition to the above-described level of driving automation, the levels-of-driving-automation switching unit 102 may holds, as a parameter, information that is a factor of determination of switching of the levels of driving automation as well as the automatically operated operation level that has been switched, and the information output unit 101 may output to the storage unit 90 the parameter of the switching factor as well as the level of driving automation. The parameter as the switching factor mentioned above is a parameter indicating information on the details of S205 to S210 which causes the transition between the respective levels shown in FIG. 2, for example. In this case, in the same way as in the levels of driving automation, it is preferable that the storage unit 90 store the parameters of the switching factors in association with the time information and in association with the levels of driving automation.

Further, in the same way as in the levels of driving automation, the storage unit 90 may also receive and record the traveling position information of the occupant's own vehicle estimated by the traveling position estimation unit 50 in association with the time information.

Further, the storage unit 90 may receive vehicle state information and occupant (driver) state information, and the like obtained by appropriate means, and may record them in association with the time information, in the same way as in the levels of driving automation.

Second Embodiment

Figure 3:
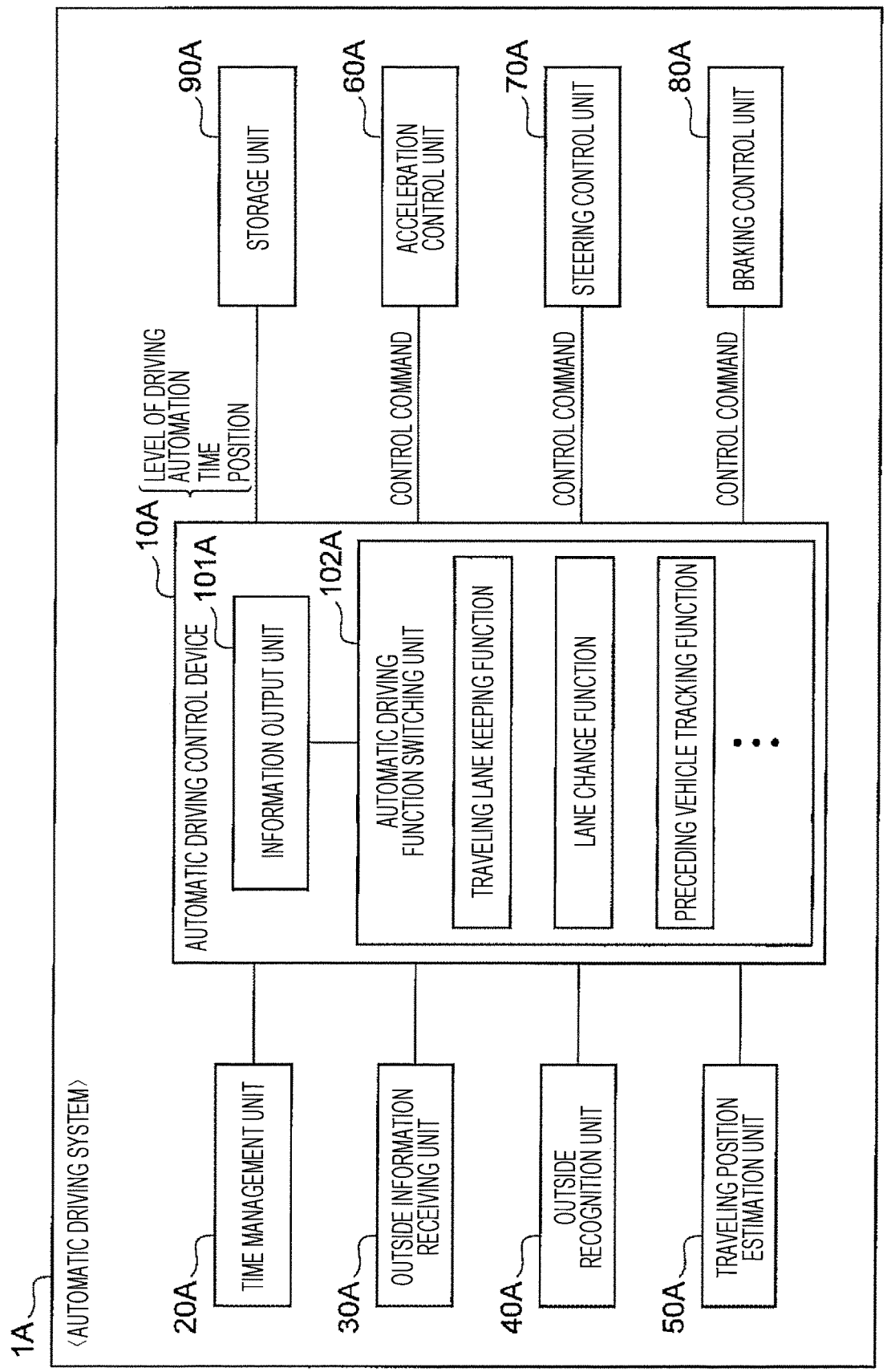
FIG. 3 is a block diagram showing a system configuration of an automatic driving system according to a second embodiment of the present invention.

FIG. 3 shows a system configuration of the second embodiment of the automatic driving system according to the present invention.

The automatic driving system 1A of the second embodiment differs from the automatic driving system 1 of the first embodiment described above mainly in the configuration of the automatic driving control device and other configurations are substantially the same as those of the automatic driving system of the first embodiment. Therefore, in the following description, the same reference numerals are given to the same configurations as those of the automatic driving system 1 of the first embodiment, and a detailed description thereof will be omitted.

As shown in FIG. 3, the automatic driving control device 10A of the automatic driving system 1A according to the second embodiment incorporates an automatic driving function switching unit 102A for making switching determination of automatic driving function for accomplishing automatic driving and performing switching of the target control mode, and an information output unit 101A for outputting the information of the automatic driving function switching unit 102A to a storage unit 90A or the like.

Here, "automatic driving function" used in the present invention will be described. The "automatic driving function" includes various functions according to degree of contribution and degree of involvement of the occupant (driver), and typical examples thereof include a traveling lane keeping function of performing traveling control of the vehicle so as to perform automatic traveling to maintaining the inside of the occupant's own vehicle traveling lane, a lane change function of performing traveling control of the vehicle so as to automatically change the lane, a preceding vehicle tracking function of recognizing the preceding vehicle traveling ahead and tracking the preceding vehicle, and the like. The automatic driving control device 10A accomplishes automatic driving of the vehicle while automatically switching a function to be operated from each of the above-described functions based on a request by the driver that has been input in advance or a situation around the driver's own vehicle. Such automatic driving functions include a function where the responsibility at the time of driving the vehicle is on the system side and a function where the responsibility is on the occupant (driver) side.

The automatic driving function switching unit 102A determines whether switching of the automatic driving function as described above is necessary or not, based on the traveling environment and traveling state of the occupant's own vehicle during automatic driving obtained from the outside information receiving unit 30A, the outside recognition unit 40A, and the traveling position estimation unit 50A, and when it is determined that switching of the automatic driving function is necessary, selects an automatic driving function corresponding to the determination. As described above, since the automatic driving function which operates while the vehicle is traveling changes from moment to moment, the automatic driving function switching unit 102A holds a parameter (information indicating an automatic driving function) indicating the automatic driving function being operated at different times.

The information output unit 101A receives the parameters of the automatic driving function under operation held by the automatic driving function switching unit 102A and outputs them to the storage unit 90A. At that time, in the same way as in the first embodiment, time information obtained from the time management unit 20A is added and outputted. The information output unit 101A periodically outputs the information to the storage unit 90A at predetermined time intervals according to the time managed by the time management unit 20A since the automatic driving starts.

Upon receiving the information output from the information output unit 101A, the storage unit 90A accumulates the received information in a form corresponding to the time information.

As described above, since the automatic driving system 1A according to the second embodiment includes the information output unit 101A that outputs a time during the automatic driving, and parameters of the (selected) automatic driving function under operation held by the automatic driving function switching unit 102A at that time, and the storage unit 90A for storing information outputted from the information output unit 101A, when, for example, the event of abnormality such as an accident or malfunction of a vehicle occurs, the automatic driving system 1A can grasp after the event the automatic driving function selected at the time of the occurrence, and clearly grasp where the responsibility lies after the event.

Also in the automatic driving system 1A of the second embodiment, in the same manner as the above-mentioned automatic driving system 1 of the first embodiment, the automatic driving function switching unit 102A may hold, in addition to the parameters of the automatic driving function as mentioned above, information that is a factor of determination of switching of the automatic driving function as the parameter together with the switched automatic driving function, and the information output unit 101A may output to the storage unit 90A the parameter of the switching factor as well as the parameter indicating the automatic driving function under operation. Here, the parameter of the switching factor of the automatic driving function is, for example, parameters indicating that an instruction input from the driver is executed, the lane change control under operation has been canceled due to a change in the surrounding environment (for example, the approaching vehicle was present), or the like, and the parameters are associated with various factors in advance. In this case, it is preferable that the storage unit 90A accumulates the parameters of the switching factor in association with the time information and in association with the parameters, in the same way as in the parameters of the automatic driving function under operation.

Further in the same way as in the automatic driving system 1 of the first embodiment, the storage unit 90A may receive the traveling position information of the occupant's own vehicle which has been estimated by traveling position estimation unit 50A associated with the time information, and may record it. The storage unit 90A may also receive vehicle state information and occupant (driver) state information, and the like obtained by appropriate means, and may record them in association with the time information.

Third Embodiment

Figure 4:
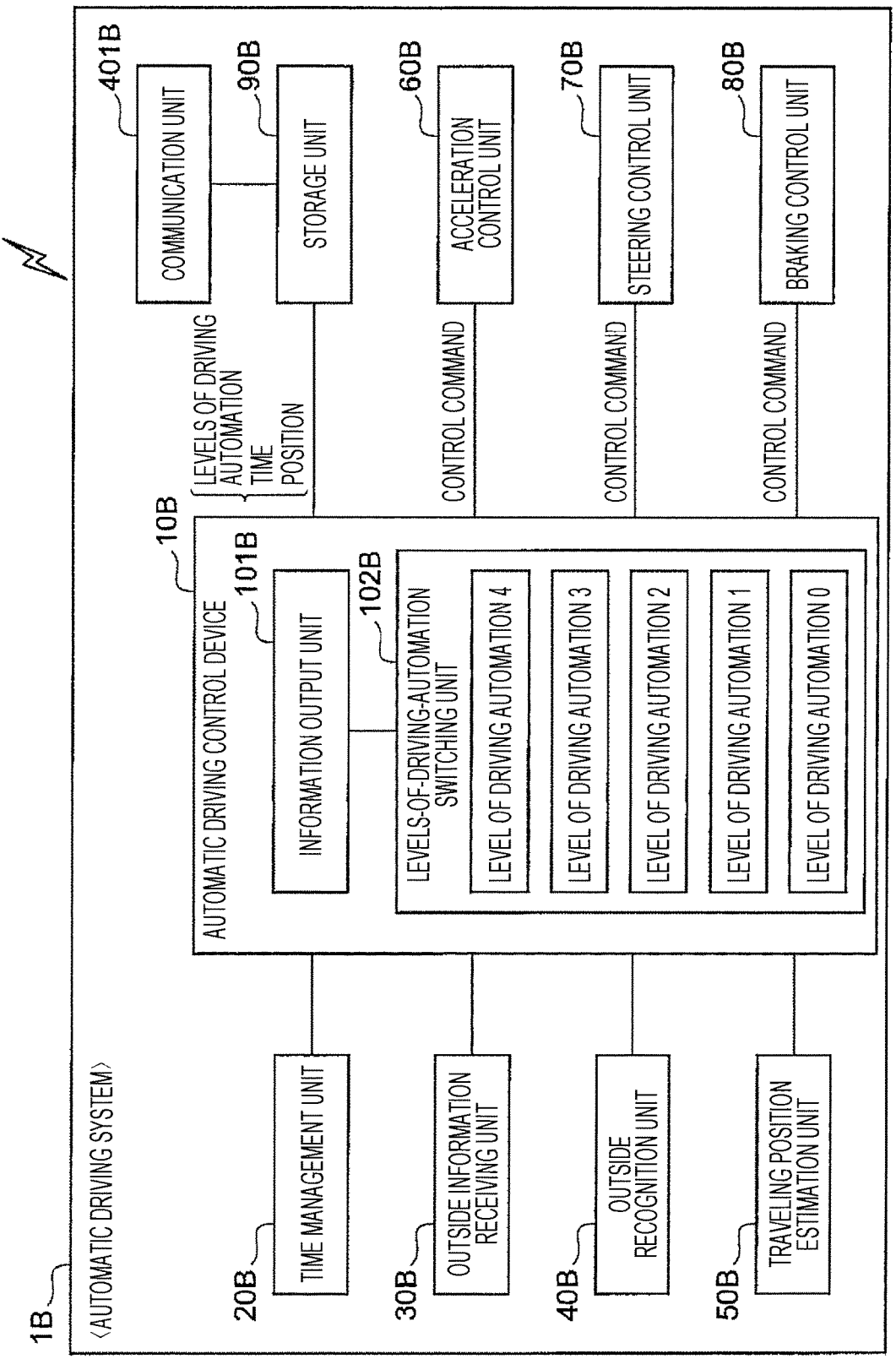
FIG. 4 is a block diagram showing a system configuration of an automatic driving system according to a third embodiment of the present invention.

FIG. 4 is a system configuration of an automatic driving system according to the third embodiment of the present invention.

The automatic driving system 1B of the third embodiment is different from the automatic driving system 1 of the first embodiment described above in that it can communicate mainly with an information collection device provided outside the vehicle. Other configurations are substantially the same as those of the automatic driving system 1 of the first embodiment. Therefore, in the following description, the same reference numerals are given to the same configurations as those of the automatic driving system 1 of the first embodiment, and a detailed description thereof will be omitted.

As shown in FIG. 4, in addition to each configuration of the automatic driving system 1 according to the first embodiment, the automatic driving system 1B of the third embodiment includes a communication unit 401B which acquires the information recorded in the storage unit 90B and outputs the information outside of the vehicle.

In detail, the communication unit 401B acquires the information recorded in the storage unit 90B and identification information for identifying the vehicle on which the automatic driving system 1B is mounted, and combines them and send them to an information collection device 402B provided outside the vehicle via a wireless line.

As described above, the automatic driving system 1B of the third embodiment, which includes the communication unit 401B that transmits the information recorded in the storage unit 90B to the information collection device 402B provided outside the vehicle, collects and manages the information recorded in the storage unit 90B by using the information collection device 402B, and thereby, for example, when the event of abnormality such as an accident or malfunction of a vehicle occurs, the level of driving automation selected at that time can be reliably grasped, and where the responsibility lies can be grasped reliably after the event.

While the communication unit 401B is connected to the storage unit 90B in FIG. 4, the automatic driving system 1B is not limited to this configuration as long as the system allows the information stored in the storage unit 90B to be acquired.

Further, the location where the information collection device 402B is installed may be anyplace where information can be received by communication.

Further, the information collection device 402B may be configured to collect and manage information received from the storage units 90B of the plurality of vehicles.

Further, the timing of transmitting information from the communication unit 401B to the information collection device 402B may be a preset time period (that is, may be a predetermined time), or may be a time when a peculiar event such as an accident or a failure occurs.

In addition, the information recorded in the storage unit 90B to be transmitted to the information collection device 402B is provided as a set of time and level of driving automation, and if necessary, parameters of the switching factor, traveling position information, vehicle state information, and driver condition information, which have been recorded, may be added to them.

Furthermore, it goes without saying that the communication unit 401B of the automatic driving system 1B of the third embodiment may be applied to the automatic driving system 1A of the second embodiment, and in that case, the information stored in the storage unit 90B to be transmitted to the information collection device 402B is provided as a set of parameters indicating the operating automatic driving function associated with the time and, if necessary, the parameters indicating the recorded switching factor, the traveling position information, the vehicle state information, and the driver condition information may be added to them.

It should be noted that the present invention is not limited to the first to third embodiments described above, and includes various modifications. For example, the first to third embodiments described above have been described in detail for describing the present invention in an easily understandable manner, and are not necessarily limited to those having all the configurations described. In addition, part of the configuration of a specific embodiment can be replaced with the configuration of another embodiment, and the configuration of another embodiment may be added to that of a specific embodiment. Furthermore, addition, deletion, replacement, with the use of another configuration, may be applied to part of the configuration of each of the embodiments.

The shown control lines and informative lines are considered to be necessary for the descriptions. All control lines and informative lines in a product are not necessarily shown. It can be considered that all components are connected with one another in practice.

REFERENCE SIGNS LIST

1 automatic driving system
10 automatic driving control device
20 time management unit
30 outside information receiving unit
40 outside recognition unit
50 traveling position estimation unit
60 acceleration control unit
70 steering control unit
80 braking control unit
90 storage unit
101 information output unit
102 levels-of-driving-automation switching unit
102A automatic driving function switching unit
401B communication unit
402B information collection device

The invention claimed is:

1. An automatic driving system which automatically selects, from each automatic driving function provided in a vehicle or each level of driving automation into which each automatic driving function is classified, an automatic driving function or a level of driving automation according to a circumstance surrounding the vehicle and/or a driving state of the vehicle, and automatically performs part of or all of a driving operation of the vehicle to automatically drive the vehicle,
wherein the automatic driving system stores information indicating a time during an automatic driving, and information indicating an automatic driving function or a level of driving automation selected at the time.

2. The automatic driving system according to claim 1, wherein the automatic driving system stores information in association with each other, the information being a factor by which the automatic driving function or the level of driving automation is selected.

3. The automatic driving system according to claim 1, wherein the automatic driving system stores information on a position of the vehicle in association with the time.

4. The automatic driving system according to claim 1, wherein the automatic driving system, when the vehicle is in a predetermined condition, or when a predetermined time comes, transmits stored information to an information collection device which is provided outside of the vehicle.

5. The automatic driving system according to claim 4, wherein the automatic driving system transmits the stored information as well as information identifying the vehicle to the information collection device.

* * * * *